United States Patent [19]

Fox

[11] 3,940,493

[45] Feb. 24, 1976

[54] NON-PROTEIN NITROGEN FEED PRODUCT AND METHOD FOR PRODUCING THE SAME

[75] Inventor: Wayne F. Fox, Des Moines, Iowa

[73] Assignee: Triple "F", Inc., Des Moines, Iowa

[22] Filed: Dec. 13, 1973

[21] Appl. No.: 424,506

Related U.S. Application Data

[63] Continuation of Ser. No. 278,572, Aug. 7, 1972, abandoned.

[52] U.S. Cl. .................. 426/69; 426/448; 426/807; 426/625; 426/448; 426/449
[51] Int. Cl.² ......................................... A23K 1/22
[58] Field of Search ............ 426/443, 445, 447–449, 426/512, 516, 520, 69, 74, 281, 290, 351, 377, 220, 416, 807, 615, 623, 635, 636, 450, 465; 71/28, 31, 64 F, 62

[56] References Cited
UNITED STATES PATENTS

| | | | |
|---|---|---|---|
| 2,965,488 | 12/1960 | Belasco | 426/69 |
| 3,192,031 | 6/1965 | Zaayenga | 71/28 |
| 3,438,780 | 4/1969 | Singer | 426/447 |
| 3,642,489 | 2/1972 | Bartley | 426/69 |

OTHER PUBLICATIONS

Condensed Chemical Dictionary, Hanley 8th Ed., Van Nostrand Reinhold Co., N.Y., 1971.

*Primary Examiner*—Norman Yudkoff
*Assistant Examiner*—Hiram H. Bernstein
*Attorney, Agent, or Firm*—Rudolph L. Lowell

[57] ABSTRACT

The feed product for ruminant animals is palatable and nontoxic and comprises an energy producing starch bearing substance such as initially ungelatinized grains or vegetable starches; a protein producing substance derived from a nonprotein nitrogenous material such as urea or ammonium salts; and an inert liquid absorbing substance such as bentonite. The three substances are initmately mixed in predetermined quantities and then supplied directly, without any preconditioning treatment and at ambient temperature, into an extruder-cooker in which by frictional heat alone, a substantial portion of the starch in the energy producing substance is gelatinized and integrated with the nonprotein nitrogenous substance to produce the feed product. The resultant feed product has a substantially neutral pH and is characterized by a very slow ammonia release from the non-protein nitrogenous substance.

6 Claims, 1 Drawing Figure

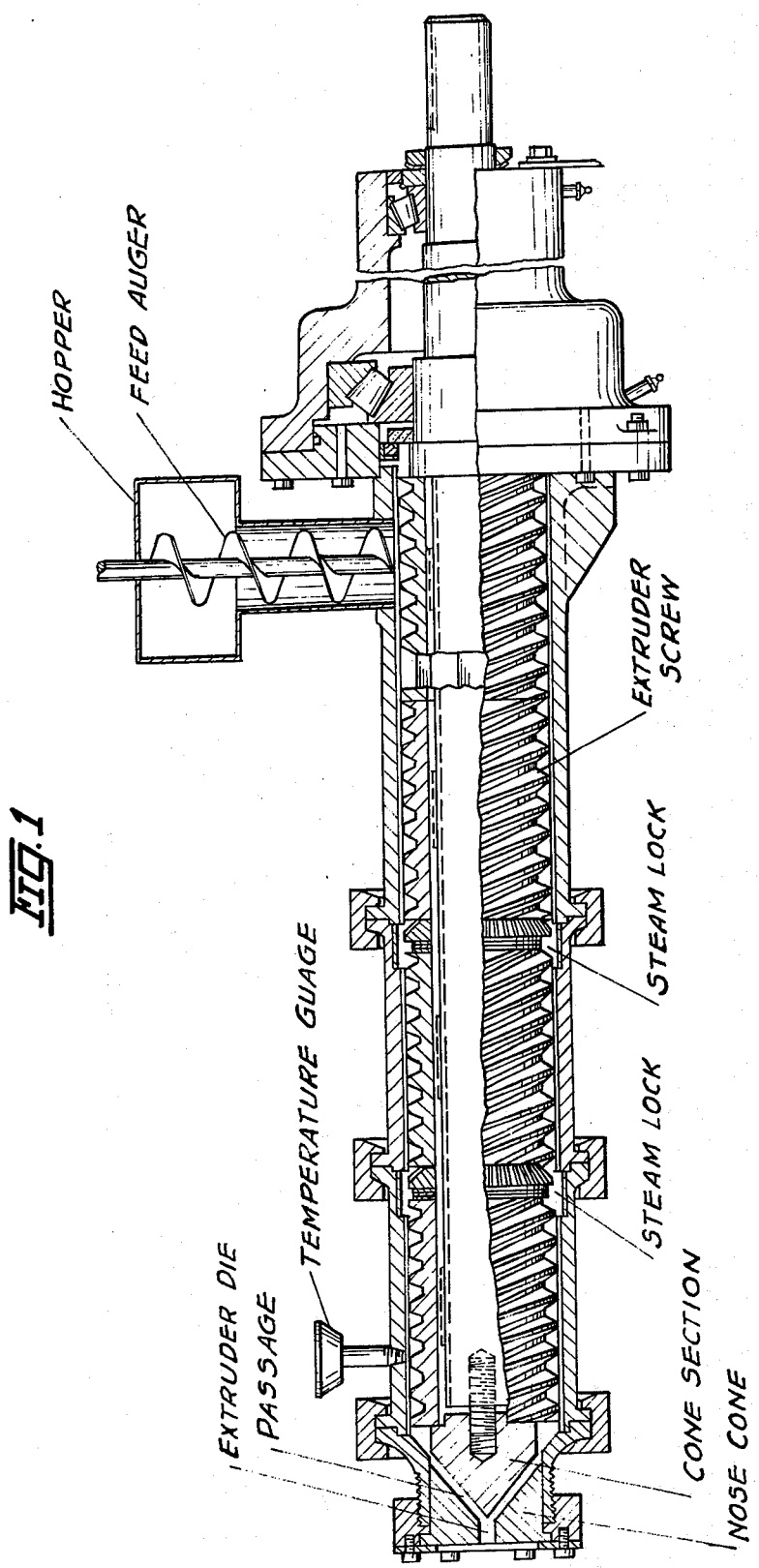

3,940,493

NON-PROTEIN NITROGEN FEED PRODUCT AND METHOD FOR PRODUCING THE SAME

This is a continuation of application Ser. No. 278,572, filed Aug. 7, 1972, and now abandoned.

BACKGROUND OF THE INVENTION

It is well known that bentonite used in conjunction with a nonprotein nitrogenous substance as urea in a ruminant feed product will react with the rumen fluid to provide a gel which effects a slow ammonia release in the rumen. Additionally it is known that bentonite provides a buffering effect in the rumen for countering an acid condition. The rumen fluid has a tendency toward acidity when high concentrate, low roughage rations are fed. When the pH of the rumen fluid drops below about 5.5 the normal protozoa and rumen bacteria do not function at optimum efficiency for feed digestive purposes.

A feed product composed of an energy bearing material, such as corn and a protein producing material, such as urea, is disclosed in U.S. Pat. No. 3,642,489. This product is characterized by a slow ammonia release and resultant reduced toxicity. In its manufacture the mixture of corn and urea is preconditioned prior to being passed into an extruder cooker. The preconditioning treatment consists in heating and agitating the corn-urea mixture along with adding moisture thereto. As a result the product must be dried prior to storage. The cost of the final product is thus appreciably increased by the requirements of preconditioning and drying so as to limit both its availability and manufacture.

SUMMARY OF THE INVENTION

The invention provides for the economic production of a palatable, nontoxic feed for ruminants consisting of a starch bearing substance such as corn, a nonprotein nitrogenous substance such as urea, and a liquid absorbing substance such as bentonite. The untreated mixture of these substances on being fed into an extruder at ambient temperature; subjected to progressively increasing compressive pressures; and then suddenly released to atmosphere results in the melting of the urea; the absorption of the melted liquid urea by the bentonite and the encapsulating or sealing of the reacted bentonite and urea in the cells of the gelatinized starch. The liquid absorbing properties of the bentonite effects a very slow ammonia release over an extended period of time so as to substantially eliminate ammonia toxicity in a high protein feed. The extruder cooker is compact and operable from a usual farm tractor. Since the initial mixture of corn, urea and bentonite is untreated and fed into the cooker-extruder at ambient temperature, the feed product can be inexpensively produced directly at a feeding station by a cattle feeder. The extruded product has a relatively low moisture content so that is requires only cooling before being stored or fed.

DESCRIPTION OF THE DRAWING

FIG. 1 shows a machine of extruder type for producing the feed product of this invention.

DETAILED DESCRIPTION OF THE INVENTION

Ruminant animals such as cattle, sheep and goats have a digestive tract that includes four stomachs, the first of which is called the rumen. A small portion of the food supplied to the rumen may pass directly to the second stomach, but the greater portion is continuously regurgitated, chewed and swallowed again. This action of the animal is commonly referred to as "chewing its cud." Following each regurgitation ans swallowing, an additional portion of the swallowed food is permitted to pass into the second stomach until all of the food has left the rumen. Experiments show that the eaten food remains in the rumen for an average time of about three days but some may remain as long as seven days.

The masticated mixture in the rumen is fermented by bacteria and protozoa. The bacteria are reproducible in large quantities in the rumen and exist in far lesser degree in the remaining stomachs. These rumen bacteria hydrolyze the urea and NPN sources such as biuret, ethylene urea and ammonia salts into ammonia when such are present in the food passed into the rumen. This ammonia is acted upon by the bacteria in the rumen to form microbial protein which is usable by the animal to supplement its normal protein diet. The natural protein intake of the animal can thus be reduced when nonprotein nitrogen is included in the animal's feed ration.

If sufficient carbohydrate is furnished in the ration, it is known that one pound of urea will theoretically be converted by the rumen bacteria to form about 2.62 to 2.875 pounds of microbial protein, so as to replace a like weight of natural protein in the ration. However, to reduce ammonia toxicity, it is desirable that the NPN substance and the carbohydrate material be broken down at substantially the same rate for a most efficient production of microbial protein. The toxic nature of the nonprotein nitrogen thus limits the amount of urea that can be used for animal feeding purposes.

If the hydrolyzation of the NPN substance is so rapid that excessive amounts of ammonia are developed, such excess is absorbed through the rumen wall, before conversion to microbial protein, and carried to the liver for conversion to urea and elimination through the kidneys. Should the rate of rumen wall absorption of the ammonia be more rapid than the rate of microbial protein conversion and natural elimination, death of the animal can result. Since animals are usually fed at least once a day it is desirable that hydrolyzation of the NPN substance be controlled so that the ammonia release takes place not only at substantially the same rate at which the carbohydrate is broken down or digested but that such release continue over an extended period of at least twenty-four hours. Stated otherwise, if the ammonia is released too fast the animal is not only subject to the toxic effects of the released ammonia, but the production of microbial protein is reduced whereby the efficiency of the animal's digestive process is impaired. In either event the full release of ammonia prior to the carbohydrate breakdown appreciably negatives the economic advantages derived from an efficient production of microbial protein.

To acheive these advantages the product of the present invention contains a gelatinized starch bearing substance such as corn, sorghum, barley, oats, wheat, hay, silage and the like combined with an NPN substance such as urea, biuret, ethylene urea or ammonium carbamate. These substances provide for the normally present ammonia in the rumen being converted into microbial protein by the metabolism of the NPN with such bacteria so as to reduce the quantity of natural protein that would otherwise be required in the feed ration. By gelatinizing substantially all of the starch bearing material the action of the rumen bacteria to hydrolyze the NPN into ammonia is inhibited and the release of ammonia controlled so that the greater portion of the released ammonia is metabolized by the bacteria to form the microbial protein available from the NPN substance.

Since animal toxicity results from a too rapid release of ammonia into the rumen, such release is additionally controlled and inhibited by the liquid absorbing inert substance bentonite, which appreciably extends the time period during which the ammonia is released relative to the release period of a feed product consisting of only urea and a gelatinized starch bearing material. By virtue of this prolonged release period of up to thirty hours and more and at a rate such that substantially all of the amounts produced is converted to microbial protein, animal toxicity is virtually eliminated, when the product is incorporated in a balanced feed ration. Additionally there is an appreciable increase in the amount of microbial protein available from the NPN substance.

In this respect it is to be noted that various forms of urea and bentonite have a pH value of up to 10 so that both of these substances are highly alkaline. However, the pH value of the product of this invention has been found to be substantially neutral, namely, about 7. As previously stated the rumen fluid has a tendency toward activity when high concentrate, low roughage rations are fed. When the pH value of the rumen fluid drops below about 5.5 the efficiency of the rumen bacteria for digestive purposes decreases. This acidity situation is taken care of by the normally alkaline characteristics of the ruminant saliva. Likewise, the rumen bacteria do not operate at optimum efficiency for digestive purposes when the pH of the rumen fluid is highly alkaline. However, there is no provision in the ruminant saliva for reducing an alkaline rumen fluid to a neutral condition. As a result digestion is slowed up by either a too high alkaline or too high acid characteristic of the rumen fluid so as to inhibit the population growth of the rumen bacteria. By virtue of the feed product having a pH value of about 7, it is apparent that the normal or existing pH value of the rumen fluid remains substantially unchanged on intake of the product so that the product is acted upon by the rumen fluid without effecting any retardation of bacteria growth.

In the following Table I there is listed preferred NPN substances for use in the present invention along with preferred ranges thereof in the completed food product.

From Table I it is seen that the total PE (protein equivalent) of the starch, lentonite reacted NPN product is preferably maintained within a range of from 50 to 100 percent by weight. It has been found that the optimum amount of lentonite in the mixture is about 25 percent by weight of the urea or NPN substance. Also tests have shown that from 5 to 15 percent of the original moisture content in the mixture is lost in the extruder-cooker machine. The moisture content of the product is thus reduced relative to the moisture content of about 15 percent of the initially mixed grain, bentonite and urea materials and, after extrusion and cooling, is less than about 12 percent. Since less than about a 13 percent product moisture content is acceptable for storage purposes the finished product requires no drying and after cooling may be stored directly without spoiling.

The time release of the ammonia in the rumen is shown in Table II for a starch NPN product relative to a starch, bentonite reacted NPN product over a thirty hour period. The slower release of the product of this invention is apparent after the third hour of product incubation.

TABLE II

PERCENT UREA REMAINING AFTER INCUBATION PERIOD AT 38° C.

| Incubation Time In Hours | Control Urea Corn | Extruded Urea, Corn & Bentonite |
| --- | --- | --- |
| 3 | 94 | 98 |
| 9 | 79 | 92 |
| 12 | 71 | 89 |
| 16 | 59 | 81 |
| 23 | 38 | 65 |
| 30 | 13 | 53 |

FIG. 1 of the drawing shows a preferred method of processing the food product of this invention. The cooking of treating machine illustrated is of the extruder type. In this machine the mixed starch bearing material, bentonite and NPN are fed into the hopper of a feed auger which forces the mixture into the inlet end of the extruder screw. The starch bearing material, such as corn, is preferably ground in a hammer mill for passage through a 3/16 or ⅛ inch screen. As is known, bentonite is commercially available in a fine powdered form. Due to what might be termed a "fluffing" tendency of the powdered bentonite, a gravity flow of the mixture is incapable of providing a filled condition of the extruder screw. Stated otherwise, the bentonite tends to "fluff" the mixture about the extruder screw.

TABLE I

| PRODUCT | Nitrogen Content of NPN Compound % | PE[1] of NPN Compound % | NPN Compound added to Produce a Starch & Bentonite Reacted NPN Product % By Weight | | Bentonite Added to Produce a Starch Bentonite, NPN Reacted Product | | Grain Added to Produce a Starch, Bentonite, NPN reacted NPN Product % By Weight | | PM In Starch and Bentonite Reacted NPN Product[2] % By Weight | |
| --- | --- | --- | --- | --- | --- | --- | --- | --- | --- | --- |
| | | | Min. | Max. | Min. | Max. | Min. | Max. | Min. | Max. |
| Urea | 45.00 | 281.25 | 15.20 | 33.75 | 3.80 | 8.40 | 57.80 | 81.00 | 50 | 100 |
| Urea | 42.00 | 262.50 | 16.50 | 36.25 | 4.10 | 9.10 | 54.70 | 79.37 | 50 | 100 |
| Urea | 46.00 | 287.50 | 15.00 | 33.00 | 3.75 | 8.25 | 58.75 | 81.25 | 50 | 100 |
| Biuret | 40.77 | 254.81 | 16.80 | 37.40 | 4.20 | 9.35 | 53.25 | 79.00 | 50 | 100 |
| Ethylene Urea | 32.54 | 203.38 | 21.50 | 47.50 | 5.40 | 11.90 | 40.60 | 73.10 | 50 | 100 |
| Ammonium Carbamate | 35.89 | 224.31 | 19.30 | 42.70 | 4.00 | 10.70 | 46.60 | 75.90 | 50 | 100 |

1. PE (protein equivalent) calculated by multiplying N by 6.25
2. Total of PE of corn containing 9% protein and PE of NPN However, this condition is eliminated by auger feeding the mixture directly into the extruder screw so as to assure an efficient compressive action of the screw on the mixture.

The mixture, without any preconditioning thereof, is thus supplied at ambient temperature to the extruder screw. This screw is comprised of several sections, separated by steamlock assemblies and terminating in a cone section having an adjustable nose cone formed with an extruder die. A temperature gauge in the cone section indicates the final cooking temperature of the mixture prior to the instant release or discharge thereof into the atmosphere from the extruder die. A preferred cooking temperature of from 260°F to 320°F is obtained by adjustment of the nose cone to restrict or open the adjustable passage in the cone section.

As the mixture travels through the machine it is subjected to progressively increasing compressive pressures and progressively heated by frictional heat only to the optimum cooking temperature indicated on the temperature gauge. The compressive pressures providing for such temperature are in the range of from about 150–200 p.s.i. From the time the mixture enters the extruder screw until it is discharged from the nose cone takes a minute or less so that the overall operation is completed efficiently and quickly.

In this operation it is thought that the urea of the mixture on reaching a melted condition at about 240°F combines with the bentonite concurrently with a gelatinizing of the corn by the combined heat and pressure in the machine. The absorption of the melted area by the technique forms a lubricant like compound so as to assist or expedite the extruding process. At the moment of release into the atmosphere, the bentonite and urea are encapsulated in the cellular structure of the gelatinized corn. During this release the corn appears to be expanded to about two or three times it normal size so as to rupture the starch cells, which on expansion absorb the melted urea and bentonite, and on retraction encapsulated the urea and bentonite. In any event the urea and bentonite are retained and combined in the resulting homogenized, reacted product which is palatable, nontoxic and has a slow ammonia release over a time period that approaches the time period required for digestion of the carbohydrate in the feed ration.

For a more detailed description of the extruding machine illustrated in the drawing, reference is made to copending application Ser. No. 25,948, filed Apr. 6, 1970.

Although the invention has been described with respect to a preferred embodiment thereof it is to be understood that it is not to be so limited since changes and modifications can be made therein which are within the full intended scope of the invention as defined by the appended claims.

I claim:

1. The method of producing a palatable, nontoxic and substantially neutral pH food product for feeding ruminant animals comprising the steps of:
   a. mixing together a predetermined quantity of an edible, ungelatinized starch-bearing food material selected from the group consisting of corn, sorghum, barley, oats, wheat, hay and silage, a predetermined amount of at least one nonprotein nitrogenous substance selected from the group consisting of urea, biuret, ethylene urea and ammonium carbamate, and a predetermined amount of bentonite,
   b. the moisture content of the mixture being less than about 15% by weight, the amount of said nonprotein nitrogenous substance by weight in said mixture being about four times greater than the weight of the bentonite, and the starch bearing food being within a range of from 40.6 to 81.25 percent by weight so that the resultant food product has a total protein equivalent of from 50 to 100 percent by weight,
   c. providing a confined path,
   d. introducing the mixture at ambient temperature into one end of said confined path,
   e. compressing the mixture over the full course of said path under progressively increasing compressive pressures to progressively heat the mixture by frictional heat only to a temperature of from 260°F. to 320°F., and then
   f. substantially instantaneously reducing the compressive pressure on the mixture at the end of said path to atmospheric pressure to produce an expanded and gelatinized product having a moisture content of less than 13 percent.

2. The method of producing a palatable, nontoxic and a substantially neutral pH food for feeding ruminant animals according to claim 1 including the steps of:
   a. continuously advancing the mixture for a minute or less through said confined path, and
   b. maintaining said compressive pressures at less than 200 p.s.i.

3. The method of producing a palatable, nontoxic and a substantially neutral pH food for feeding ruminant animals according to claim 1 including the step of:
   a. applying a compressive pressure on the mixture being introduced into said one end of the confined path.

4. The method of producing a palatable, nontoxic and substantially neutral pH food product for feeding ruminant animals comprising the steps of:
   a. mixing together by weight 40.6 to 81.25 percent of an edible, ungelatinized starch-bearing food material selected from the group consisting of corn, sorghum, barley, oats, wheat, hay and silage, 15 to 47.5 percent of at least one nonprotein nitrogenous substance selected from the group consisting of urea, biuret, ethylene urea and ammonium carbamate, and 3.75 to 11.9 percent of bentonite,
   b. the moisture content of the mixture being less than about 15 percent by weight, so that with said nonprotein nitrogenous substance by weight being between 15 to 47.5 percent of the weight of the mixture the resultant food product has a total protein equivalent of from 50 to 100 percent by weight,
   c. providing a confined path,
   d. introducing the mixture at ambient temperature into one end of said confined path,
   e. compressing the mixture over the full course of said path under progressively increasing compressive pressures to progressively heat the mixture by frictional heat only to a temperature of from 260°F. to 320°F., and then
   f. extruding the mixture from the opposite end of said path into the atmosphere to produce an expanded and gelatinized product having a moisture content of less than 13 percent.

5. The method of producing a palatable, nontoxic and substantially neutral pH food product for feeding ruminant animals comprising the steps of:
   a. mixing together by weight 57.8 to 81.00 percent of an edible, ungelatinized starch-bearing food material selected from the group consisting of corn, sorghum, barley, oats, wheat, hay and silage, 15.2 to 33.75 percent of urea having a nitrogen content of about 45 percent, and 3.8 to 8.4 percent bentonite,
   b. the moisture content of the mixture being less than about 15 percent by weight, so that with said urea by weight being between 15.2 to 33.75 percent of the weight of the mixture the resultant food product has a total protein equivalent of from 50 to 100 percent by weight,
   c. providing a confined path,
   d. introducing the mixture at ambient temperature into one end of said confined path,
   e. compressing the mixture over the full course of said path under progressively increasing compressive pressures to progressively heat the mixture by frictional heat only to a temperature of from 260°F. to 320°F., and then
   f. extruding the mixture from the opposite end of said path into the atmosphere to produce an expanded and gelatinized product having a moisture content of less than 13 percent.

6. The method of producing a palatable, nontoxic and substantially neutral pH food product for feeding ruminant animals comprising the steps of:
   a. mixing together by weight 58.75 to 81.25 percent of an edible, ungelatinized starch-bearing food material selected from the group consisting of corn, sorghum, barley, oats, wheat, hay and silage, 15 to 33 percent of urea having a nitrogen content of about 46 percent, and 3.75 to 8.25 percent of bentonite,
   b. the moisture content of the mixture being less than about 15 percent by weight, so that with said urea by weight being between 15 to 33 percent of the weight of the mixture the resultant food product was a total protein equivalent of from 50 to 100 percent by weight,
   c. providing a confined path,
   d. introducing the mixture at ambient temperature into one end of said confined path,
   e. compressing the mixture over the full course of said path under progressively increasing compressive pressures to progressively heat the mixture by frictional heat only to a temperature of from 260°F. to 320°F., and then
   f. extruding the mixture from the opposite end of said path into the atmosphere to produce an expanded and gelatinized product having a moisture content of less than 13 percent.

* * * * *